United States Patent [19]

Hesterman

[11] Patent Number: 5,056,984
[45] Date of Patent: Oct. 15, 1991

[54] APPARATUS AND METHOD FOR TOWING A TRACTOR EQUIPPED WITH A FRONT END LOADER

[76] Inventor: Martin Hesterman, Box 45, Ormiston, Saskatchewan, Canada, S0H 3H0

[21] Appl. No.: 559,159

[22] Filed: Jul. 25, 1990

[51] Int. Cl.⁵ .............................................. B62D 53/00
[52] U.S. Cl. .................... 414/685; 280/433; 280/402; 280/418.1; 37/118 R; 37/DIG. 3; 414/912; 414/722
[58] Field of Search .............. 414/685, 722, 912, 607, 414/608; 37/DIG. 3, 118 A, 118 R; 280/292, 433, 400, 495, 402, 418.1, 767; 180/209

[56] References Cited

U.S. PATENT DOCUMENTS

| | | | |
|---|---|---|---|
| 3,333,718 | 8/1967 | Durham | 280/418.1 X |
| 3,594,018 | 7/1971 | Graetz | 280/767 X |
| 3,656,780 | 4/1972 | Nordstrom | 280/418.1 |
| 3,680,720 | 8/1972 | Strange | 280/418.1 X |
| 3,807,587 | 4/1974 | Maurer | 37/118 R |
| 4,037,681 | 7/1977 | Gorby | 280/495 X |

Primary Examiner—Frank E. Werner
Assistant Examiner—James T. Eller
Attorney, Agent, or Firm—Adrian D. Battison; Stanley G. Ade; Murray E. Thrift

[57] ABSTRACT

An attachment device for a tractor of the type including a front end loader bucket and a rear mounted backhoe comprises a rear axle and ground wheels for positioning beneath the backhoe tower and attachable to the rear of the tractor by forwardly extending straps. Beneath the bucket is permanently attached a kingpin device formed by a plate and pin mounted upon a bracket which is so shaped that the pin and plate are wholly above the plane of the lower wall of the bucket so that the bucket can be normally used with the kingpin devide in place and such that when the bucket is fully retracted the kingpin is presented vertically downwardly. Thus the bucket can be positioned upon a conventional fifth wheel of a road tractor.

9 Claims, 1 Drawing Sheet

U.S. Patent  Oct. 15, 1991  5,056,984
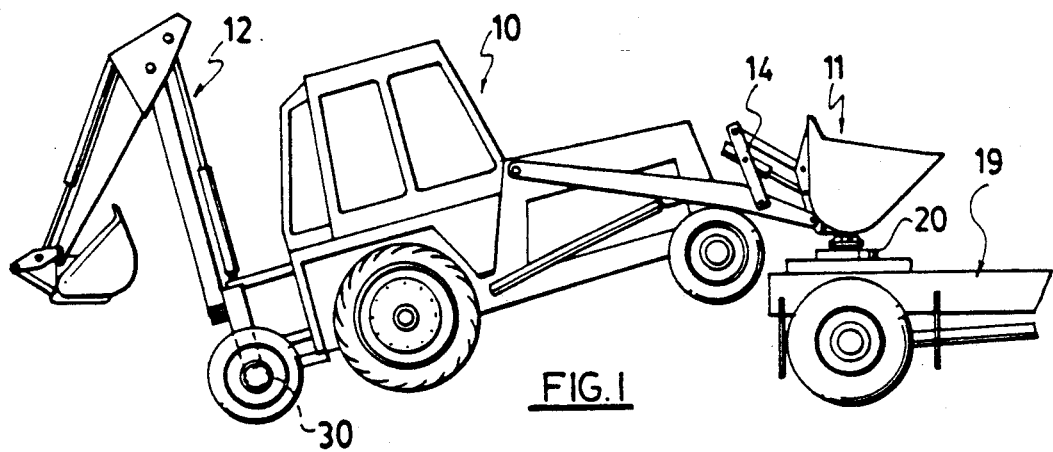
FIG.1
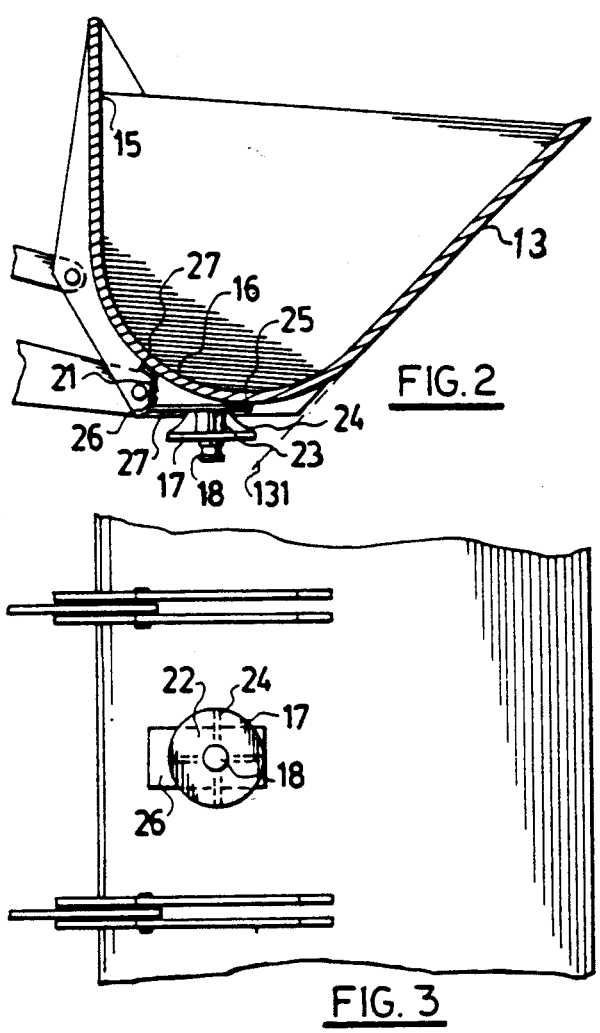
FIG.2
FIG.3
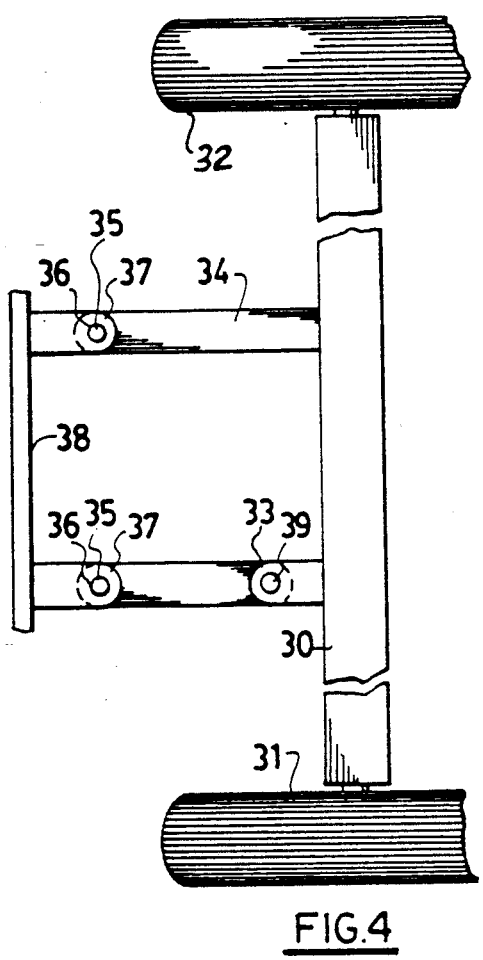
FIG.4

5,056,984

APPARATUS AND METHOD FOR TOWING A TRACTOR EQUIPPED WITH A FRONT END LOADER

BACKGROUND OF THE INVENTION

This invention relates to apparatus for towing a tractor equipped with a front end loader and particularly to a device which can allow the tractor to be towed at high speed for highway travel.

The conventional technique for towing tractors of this type which are generally equipped with a front end loader and in many cases also with a backhoe is to load them onto a flat bed truck which is then towed using a highway tractor.

However, the loading and unloading can be a time consuming and difficult process and can severely eat into the working day thus substantially increasing the costs of using equipment of this type.

This is a particular problem in relation to construction work where the equipment is required to be operated in a number of different locations which may be widely spaced and hence not suitable for driving the tractor between the places of operation.

Arrangements have previously been proposed for transporting heavy machinery such as bulldozers or the like in Canadian patents 896421 (Nordstrom) and 898750 (Graetz). Devices of this type have however been designed specifically for bulldozers and also require specialized equipment on the towing tractor for receiving the cooperating coupling mechanism between the bulldozer and the towing tractor. These devices therefore have not achieved significant success and have not provided a device which is suitable for the conventional front end loader/backhoe.

SUMMARY OF THE INVENTION

It is one object for this invention, therefore, to provide a kit of parts for attachment of a tractor including a front end loader bucket to a highway tractor vehicle which enables the use of a conventional highway tractor vehicle without modified equipment and which enables the front end loader bucket to be used normally while the attachment mechanism remains permanently mounted on the bucket.

According to the first aspect of the invention, therefore, there is provided a kit of parts for attachment of a tractor, including a front end loader bucket shaped to define a substantially planar lower wall, a rear wall and a curved interconnecting wall, to a highway tractor vehicle of the type having a fifth wheel device for a trailer for high speed highway travel, the kit of parts comprising axle and ground wheel means including means for attachment to said tractor rearwardly of rear wheels thereof and a kingpin device for cooperating with said fifth wheel device in a towing position including a plate for arranging horizontal in said towing position, a pin extending therefrom at right angles thereto and a bracket for attachment of said plate to said bucket at said inter-connecting wall thereof, said bracket being shaped and arranged such that, when attached to the bucket, the plate and pin are positioned so that they are wholly above the plane of the lower wall and, when the bucket is pulled upwardly, the pin can project vertically downwardly for engaging the fifth wheel device.

According to the second aspect of the invention, therefore, there is provided a tractor comprising of a front end loader bucket shaped to define a substantially planar lower wall, a rear wall and a curved interconnecting wall, and means for attachment to the tractor to a highway tractor vehicle of the type having a fifth wheel device for a trailer for high speed highway travel, said attachment means comprising axle and ground wheel means including means for coupling said axle to said tractor rearwardly of rear wheels thereof and a kingpin device for cooperating with said fifth wheel device in a towing position including a plate for arranging horizontal in said towing position, a pin extending therefrom at right angles thereto and a bracket mounting said plate and pin on said bucket at said interconnecting wall thereof, said bracket being shaped and arranged such that the plate and pin are positioned so that they are wholly above the plane of the lower wall and, when the bucket is pulled upwardly, the pin projects vertically downwardly for engaging the fifth wheel device.

The device therefore comprises a simple attachment mechanism permanently attached to the bucket out of the way of the normal operation of the bucket but positioned and angled so that, with the bucket in a retracted position, the kingpin device can cooperate with the conventional fifth wheel device of a road tractor.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention.

DESCRIPTION OF THE DRAWINGS

FIG. 1 is a side elevational view showing a tractor of the type including a front end loader bucket and a backhoe mounted in a highway transportation position on a highway tractor.

FIG. 2 is a side elevational view on an increased scale showing the construction of the bucket and kingpin device.

FIG. 3 is an underside view of the bucket of FIG. 2.

FIG. 4 is an underside view of the tractor of FIG. 1 showing the rear mounted axle and ground wheels.

In the drawings, like characters of reference indicate corresponding parts in the different figures.

DETAILED DESCRIPTION

A conventional field tractor is generally indicated at 10 and includes a conventional front end loader bucket 11 and a conventional backhoe arrangement 12 all of which are strictly conventional in construction including hydraulic drive lever mechanisms for operating the backhoe and for operating the front end loader bucket. In particular, the angle of the bucket, that is, the angle of a lower wall 13 of the bucket relative to a horizontal plane, can be adjusted by conventional parallelogram linkage 14 including hydraulic actuating cylinders. This enables the bucket in conventional operation to move so that the planar lower wall 13 lies in a horizontal plane for digging into material and then to tilt rearwardly to retain that material in the bucket for transportation.

The bucket, as shown in more detail in FIG. 2, therefore comprises the planar lower wall 13, a rear wall 15 which extends generally upwardly therefrom and inclined forwardly thereto to define a receiving area for material picked up by the lower wall. A rear interconnecting wall 16 is generally curved and extends between the planar and the upstanding rear wall 15.

An imaginary extension of the plane of the lower wall 13 is indicated at 131. Positioned wholly above this extension is a kingpin device comprising a plate 17 and a pin 18 both of which are of conventional construction for cooperation with a conventional fifth wheel device 20 of a highway tractor 19. The plate 17 is mounted upon a bracket 21 which is in the form of a flat strap 22 parallel to the plate. The flat strap is connected to the plate via a shaft 23 and outwardly extending support flanges 24. The strap 22 has at one end a connection portion 25 for welding or other suitable attachment to the outer surface of the bucket. An upstanding elevation portion 26 is attached to the other end of the strap 22 and holds the strap at that end away from the surface of the bucket so that an opposed end of the elevation portion 26 is attached to the bucket at 27 by welding or other suitable attachment. This supports the strap 22 and the plate 17 in position wholly above the plane 131 and at an angle so that with the bucket fully retracted, that is, rotated as shown in FIG. 2 in an anti-clockwise direction, the plate 17 is horizontal and the pin 18 vertical.

Positioned at the rear of the tractor 10 beneath the backhoe tower 12 is an additional road axle 30. The road axle carries road wheels 31 and 32 in conventional manner. The axle 30 is of generally rectangular construction either formed as a square tube or as an I-beam and can be received directly beneath the tower 12 so the tower 12 rests directly upon the axle. The axle is attached to the rear of the tractor by a pair of forwardly extending arms 33 and 34 in the form of flat straps each of which has at a forward end an opening 35 for receiving a pin 36 which cooperates with a lug 37 attached to the rear of the tractor indicated in FIG. 4 at 38. The left hand strap 33 is formed in two portions with a central pivot pin 39.

When it is desired to mount the tractor into the road transport condition, the bucket 11 is lifted and rotated so as to present the pin downwardly for engagement with the fifth wheel device 20 of the tractor 19. It will of course be appreciated that the kingpin device is permanently attached to the bucket and is maintained at its position that is out of the normal operation movement of the bucket behind and above the lower wall 13.

With the kingpin device resting in the fifth wheel device, the rear end of the tractor is lifted from the ground by operation of the backhoe in a known manner so that the rear wheels of the tractor are lifted from the ground. In this position the axle and ground wheels can be moved beneath the backhoe tower and the pin 36 cooperating with the arm 34 placed into position. In some cases where the ground is uneven, the opening 35 of the arm 33 cannot be moved into alignment with the opening in the lug 37 in which case position of the tractor 10 can be moved by adjustment of the backhoe 12 until the height of the straps is properly arranged so that the forward portion of the arm 33 can be pivoted about the vertical axis defined by the pin 39 into cooperation with the lug 37.

In this position the backhoe 12 can be retracted so that the tractor is lowered onto the ground wheels 31 and supported thereby on the axle 30.

On departing the tractor, the operator can at that point actuate the switch to lower the arms of the bucket 11 so that the tractor is lifted by the bucket onto the kingpin device 20 so that both the forward and rear wheels of the tractor 10 are lifted from the ground and the tractor is wholly supported at the forward end on the bucket 11 and at the rearward end on the axle and ground wheels.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A tractor having front and rear wheels, comprising a front end loader bucket having a substantially planar lower wall, a rear wall and a curved interconnecting wall, and means for attachment of the tractor to a highway tractor vehicle for towing the trailer, said highway tractor vehicle having a fifth wheel device typically associated with a trailer for high speed highway travel, said attachment means comprising axle and ground wheel means including means for coupling said axle to said tractor rearwardly of said rear wheels, and a kingpin device for cooperating with said fifth wheel device in a towing position comprising a plate, a pin extending from said plate at right angles thereto, and a bracket for mounting said plate and pin on said bucket at said interconnecting wall thereof, said bracket being shaped and arranged such that the plate and pin are positioned so that they are wholly above the plane of the lower wall and, when the bucket is pulled upwardly to a rolled-back position, the plate is substantially horizontal and the pin projects vertically downwardly for engaging the fifth wheel device whereby the pin is engagable with the fifth wheel device, and the tractor may be towed by the highway tractor vehicle.

2. The invention according to claim 1 wherein said bracket includes a pair of connecting portions at respective ends thereof attached to the bucket, said bracket further including an elevation portion for lifting one end of the bracket whereby the plate is arranged at an angle to the adjacent portion of the interconnecting wall and at an angle to the planar lower wall.

3. The invention according to claim 2 wherein the bracket comprises a first planar strip member having at one end one of said connecting portions and having at an opposed end said elevating portion, the plate being substantially parallel to said planar strip.

4. The invention according to claim 1 wherein a forwardmost edge of the plate lies substantially in the plane of the lower wall.

5. The invention according to claim 1 wherein the bracket is arranged such that in a fully retracted position of the bucket relative to a support arm, the plate is in said substantially horizontal towing position.

6. The invention according to claim 1 wherein said axle and ground wheel means includes a pair of forwardly extending arms for engaging cooperating lugs on a rear face of said tractor.

7. The invention according to claim 6 wherein one of said arms includes pivot means so as to allow pivotal movement of a forward portion thereof about a substantially vertical axis relative to a rearward portion thereof fixed to said axle.

8. The invention according to claim 6 wherein each of said arms comprises a substantially horizontal plate having therethrough a substantially vertical opening for receiving a pin to latch the arm to respective lug.

9. The invention according to claim 1 wherein said tractor includes a backhoe tower wherein said axle is arranged for positioning beneath the backhoe tower for supporting the tractor.

* * * * *